United States Patent [19]

Evans et al.

[11] 4,362,977
[45] Dec. 7, 1982

[54] METHOD AND APPARATUS FOR CALIBRATING A ROBOT TO COMPENSATE FOR INACCURACY OF THE ROBOT

[75] Inventors: Roger C. Evans, Yorktown Heights; John E. Griffith, Mahopac; David D. Grossman, Chappaqua; Myron M. Kutcher, Woodstock, all of N.Y.; Peter M. Will, Boca Raton, Fla.

[73] Assignee: International Business Machines Corporation, Armonk, N.Y.

[21] Appl. No.: 164,391

[22] Filed: Jun. 30, 1980

[51] Int. Cl.³ .............................................. G05B 19/42
[52] U.S. Cl. .................................. 318/568; 318/632; 364/513
[58] Field of Search ................. 318/568, 632; 364/513

[56] References Cited

U.S. PATENT DOCUMENTS 4,011,437 3/1977 Hohn ............................ 318/568 X
4,025,838 5/1977 Watanabe ...................... 318/568 X
4,140,953 2/1979 Dunne ................................ 318/632

*Primary Examiner*—B. Dobeck
*Attorney, Agent, or Firm*—Philip Young; John J. Goodwin

[57] ABSTRACT

A method and apparatus for calibrating a robot and using the results of this calibration to compensate for inaccuracies of the robot and also to diagnose robot deterioration. The method includes moving the robot to a set of nominal positions, commanded by the robot controller or measured by position encoders built into the robot, and determining the associated actual positions by measuring the robot position with an independent accurate measuring means or by aligning the robot end effector with an accurate calibration mask. The calibration results are stored and subsequently used to compensate for robot inaccuracy so that the robot moves to the actual desired positions.

1 Claim, 5 Drawing Figures

FIG. 2  CALIBRATION
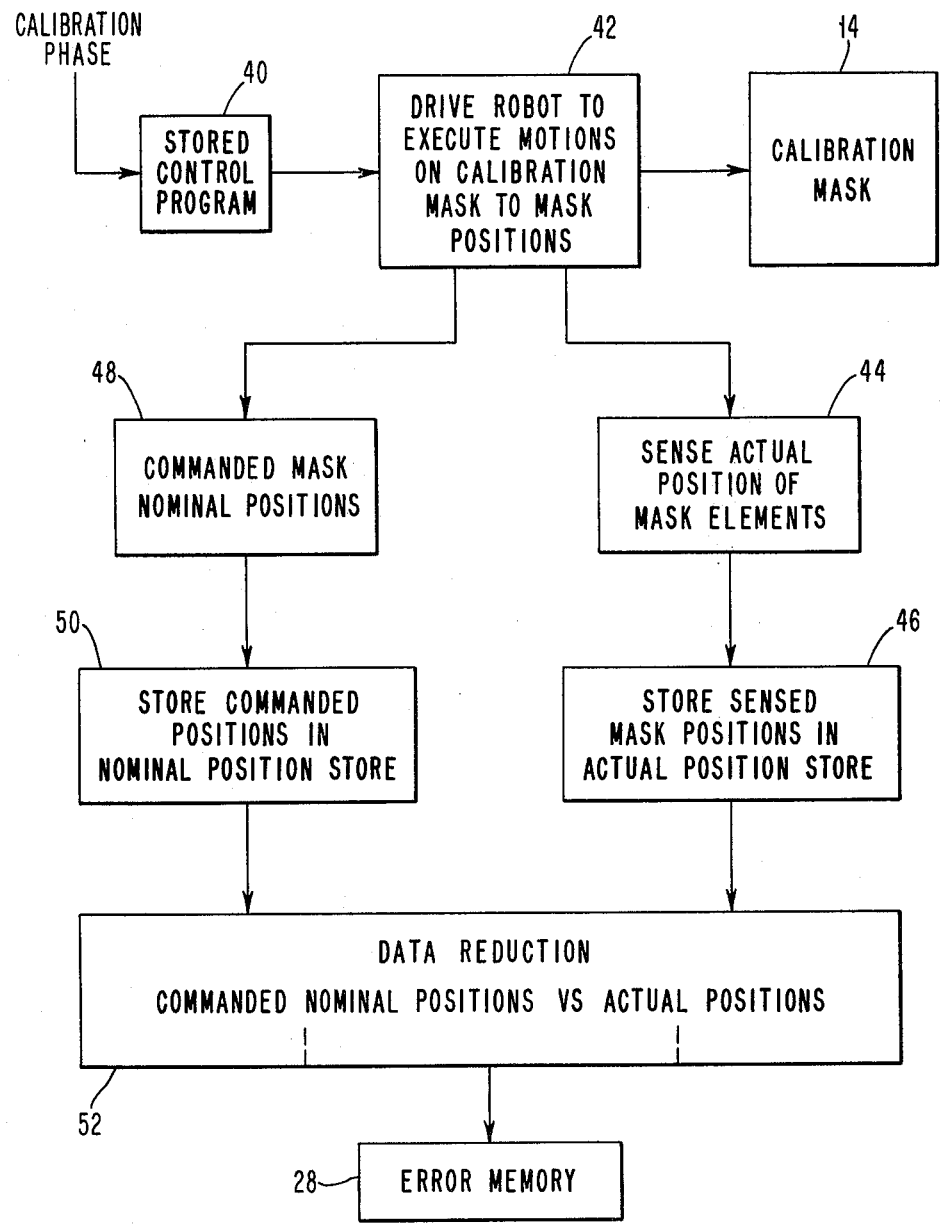

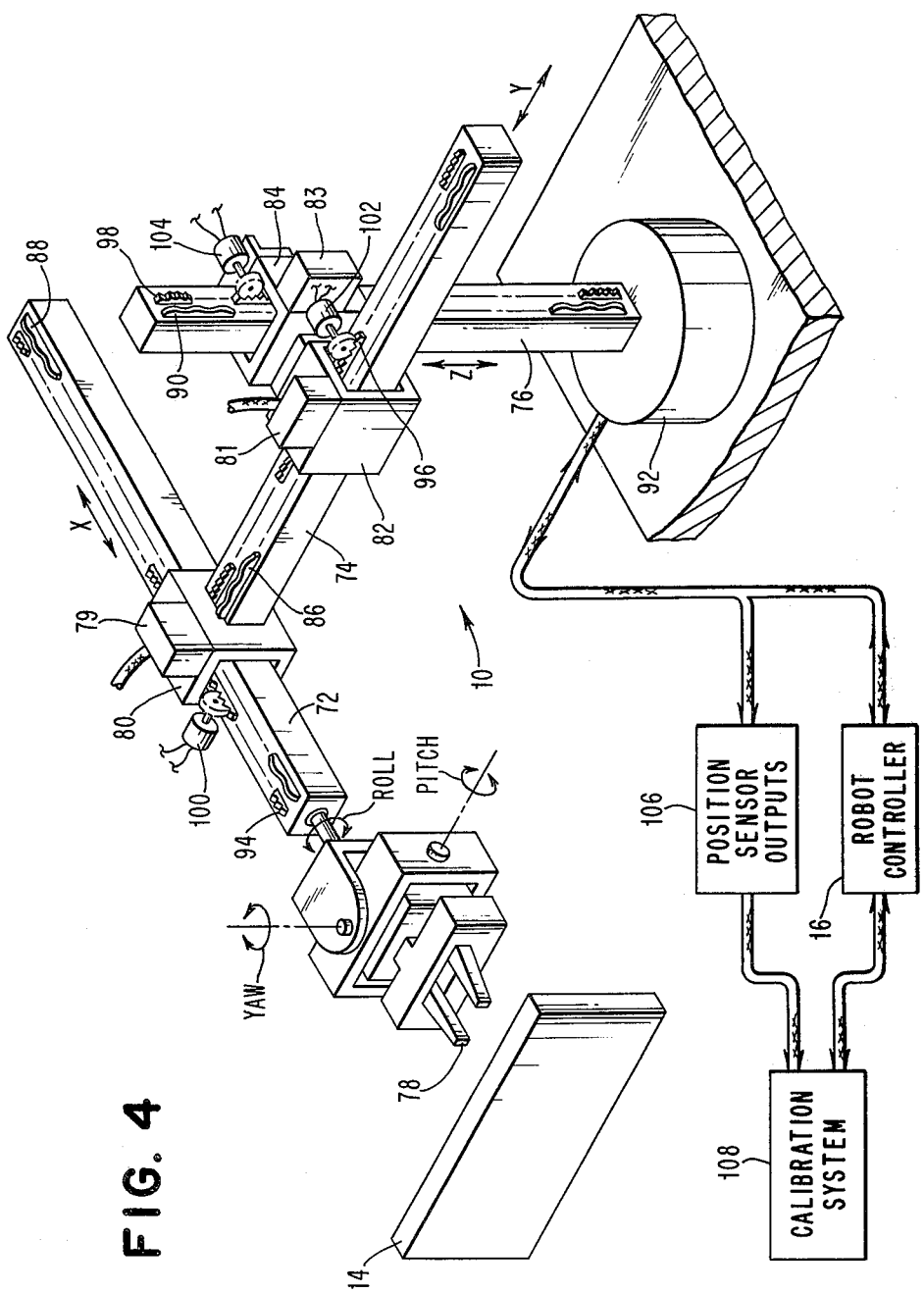

METHOD AND APPARATUS FOR CALIBRATING A ROBOT TO COMPENSATE FOR INACCURACY OF THE ROBOT

DESCRIPTION

1. Technical Field

The present invention relates to programmable machines known as manipulators or robots, and more particularly to a manipulator which employs a calibration technique for improved accuracy of movement.

2. Background Art

There is currently significant development in the area of robots for industrial operations in manufacturing and assembly. A robot is typically an articulated arm-like mechanism having a sequence of links separated by joints which in turn are driven by motors. At the end of the mechanism is an end effector that can interact with a workpiece. Because robot applications generally require the interaction of a robot with a workpiece, positioning errors of the robot end effector with respect to the workpiece may prevent proper operation of the application. Such positioning errors may be due either to errors in the workpiece or in the robot or both.

The state of the art and prior literature disclose many general methods for compensating for errors in the workpiece. However, the state of the art includes only very limited methods for compensating for errors in the robot itself, such as deformation errors and errors in the positions of joints.

U.S. Pat. No. 3,906,323 to Ono et al describes electrical control means for compensating for undesirable movements in moving members or joints of a robot, such as the movements of the hand base, the finger base, and the wrist. Here the error signal that is generated is limited to correcting for errors in the joint itself and does not include errors in connecting linkage or the variations in errors due to the specific locations and movements of the robot end effector over the different work areas.

One known apparatus for compensating for deformation in a robot arm is described by Flemming in U.S. Pat. No. 4,119,212 wherein a plurality of linkage elements are provided between the robot hand and a known position to enable the determination of the location of an article held in the robot hand by a vector summing operation.

INDUSTRIAL APPLICABILITY

Accuracy and repeatability are two related but distinct properties of a robot. Accuracy is a measure of the ability of a robot's end effector to be positioned at a desired position. Repeatability is a measure of the ability of a robot to return to a previously established position. In general, repeatability is much easier and less costly to obtain than accuracy.

The most common method of programming a robot is to guide it to the desired positions. When a robot is programmed by the guiding method, repeatability is important and accuracy is irrelevant. When a robot is programmed by other means, such as the use of a programming language, accuracy is very important. For example, when a robot unloads parts from a palletized array, it is important that each indexing motion bring the robot accurately to the next part.

It is an object of the present invention to provide a method for compensating for all positional errors in a robot, including errors due to both mechanical and electrical causes. It is another object to provide an alternative to the difficult and costly approach of building high accuracy into a robot, specifically by precision machining of the links. It is another object to provide a method of achieving accuracy of a robot from a repeatability procedure.

SUMMARY OF THE INVENTION

These and other objects are achieved by the present invention which provides a method and apparatus for calibrating a robot and using the results of this calibration to compensate for inaccuracies in the robot. The results of this calibration provide a benchmark against which future calibrations can be compared to diagnose robot deterioration.

The calibration method involving moving the robot to a set of nominal positions and determining the associated actual positions. The nominal positions are those values commanded by a robot controller or measured by position encoders built into the robot. The actual positions are determined either by measuring the robot position with an independent accurate measuring means such as a digitizing tablet or video, or by aligning a robot end effector with an accurate calibration mask possessing datum points, edges, and surfaces, or by a combination of these means. Alignment with this calibration device may be under human control or performed automatically using feedback provided by sensors in the robot or by auxiliary apparatus attached to the robot, to independent measuring means, or to the calibration mask.

The results of this calibration are reduced to tabular or formula form and stored until needed. Subsequently, when the robot is to be moved to a desired position, the stored calibration information is recalled, appropriate computation is performed, and then the robot is commanded to move to a position slightly different from the desired position but such that the known error found by calibration will compensate for the robot's inaccuracy and cause the robot to move actually to the desired position with great accuracy.

The calibration method and subsequent use of calibration data are dependent on repeatability of robot positioning. If this repeatability deteriorates, then the results of the prior calibration may also be used as a benchmark against which a new calibration can be compared to diagnose robot deterioration.

BRIEF DESCRIPTION OF THE DRAWINGS

FIG. 2 is a system flow diagram of the calibration method;

FIG. 4 shows a robot manipulator connected to the calibration system; and

BEST MODE FOR CARRYING OUT THE INVENTION

Figure 1:
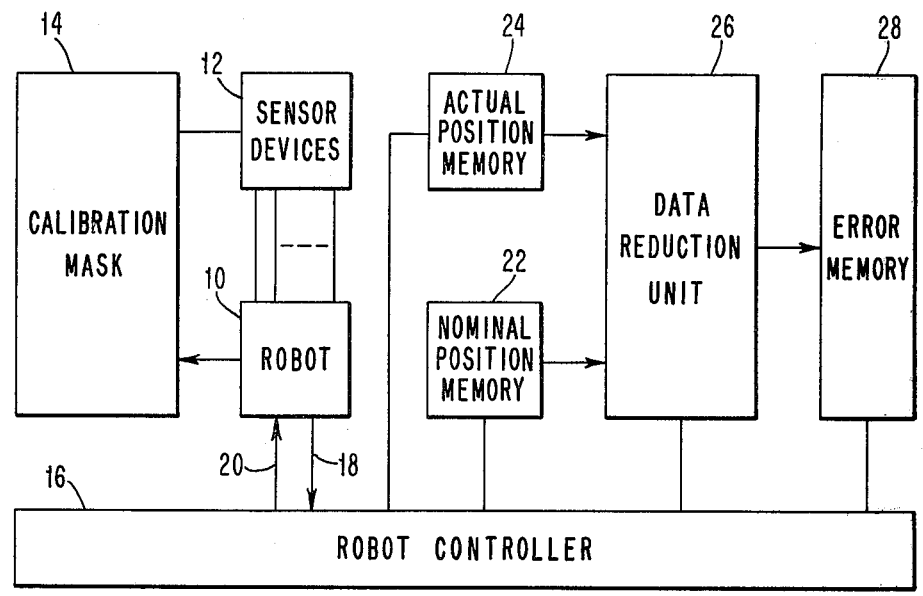
FIG. 1 is a block diagram of the calibration system, illustrative of the present invention.

Referring to FIG. 1, there is shown a block diagram of the calibration system for a robot 10 having position sensors 12 similar to the robot and position sensors shown and described in U.S. Pat. No. 4,001,556 to G. A. Folchi et al. The robot 10 includes manipulator arms and fingers which follow computer controlled linear movements along the X, Y, and Z axes as well as pitch, roll, and yaw angular motions. Position sensing devices, in the form of potentiometers, are provided in the various movable portions of the manipulator, such as in the fingers and along the X, Y, and Z manipulator arms and tracks, for providing position signals which are used by control circuits for generating the appropriate action commands to the manipulator arm and finger drive motors, depending on the stored action programs.

The stored action programs are loaded in a robot controller 16 which executes stored programs, receives manipulator sensor signals on line 18 from sensors such as X, Y, Z, and $\theta x$, $\theta y$, and $\theta z$ sensors and finger force sensors, and provides command signals in line 20 for driving the robot 10 to perform the programmed actions. The calibration system includes a nominal position memory 22 for storing the coordinates of the probe position that is commanded to and known by the robot controller 16, and an actual position memory 24 for storing the actual, known coordinate positions of the robot probe taken during the calibration procedure. A data reduction unit 26 derives the error relationship between the commanded nominal positions and the sensed, known actual positions and provides this error data to an error memory 28.

The operation of the system will be described by referring to three phases of operation, namely calibration, compensation, and optional diagnosis. Generally, the calibration method involves moving the robot 10 to a set of nominal positions and determining the associated actual positions by independent measuring means or by alignment with a calibration mask 14. Alignment may be under human control or performed automatically using feedback sensors. The results of this calibration are reduced and stored until needed.

Specifically, the calibration method is shown in FIG. 2 wherein the robot controller 16 executes a stored control program 40 that causes control signals to be sent on lines 20 to drive at 42 the robot probe in its end effector towards the calibration mask 14. The robot sensors detect proximity or contact with an element mask 14 and cause the robot to stop. At each such position, the actual position of the mask element, which is known to the program in the robot controller 16 is transmitted at 44 to the controller 16 and then stored at 46 as an element in the actual position memory 24. Also, at each such position, the nominal position 48 of the robot, as determined by the commanded position known to the robot controller 16 at the moment the sensors 12 caused a stop or as determined by position encoder on the robot, is stored at 50 as an element in the nominal position memory 22. When the stored control program has moved the robot to a set of positions at each of which the actual and nominal positions have been stored as described above, the robot controller 16 may direct this data to be input to an optional data reduction operation 52. The data reduction 52 forms tables or formulas relating nominal and actual positions. The robot controller 16 then directs these tables or formulas to be stored in the error memory 28. This step completes the calibration phase.

The actual position memory 24, the nominal position memory 22, and the error memory 28 can be in the form of magnetic tape or disk, or they can be in storage in the same processor as the robot controller 16, in which case such memories can also be part of the stored control program in the robot controller. The data reduction unit 26 can be special electronic hardware, or can be implemented as an algorithm contained in the same processor as the robot controller 16, in which case this algorithm can also be part of the stored control program in the robot controller.

Figure 3:
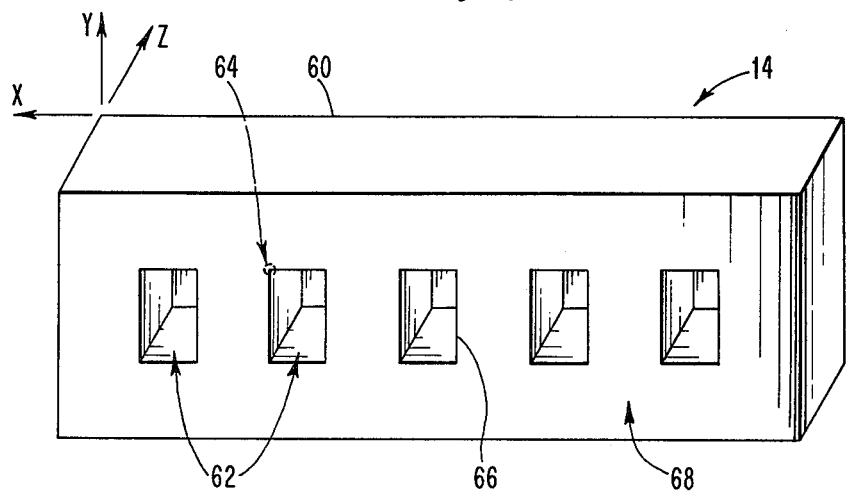
FIG. 3 is an isometric drawing of a linear calibration mask used to calibrate the system.

FIG. 3 is an isometric drawing of the linear calibration mask 14, consisting of a solid plate 60 containing a linear array of blind holes 62 with accurate datum points 64, edges 66, and surfaces 68. The robot end effector contains a probe which is much smaller than each hole. Using sensors in the robot, the robot locates each hole 62, places the probe into the hole 62 and locates one or more datum elements. This method is repeated for each hole 62 in the array.

The axis (X, Y, or Z) of calibration mask 14 is aligned with a corresponding one of the linear axes of the robot 10, and the calibration performed according to the method described above. Subsequently, the calibration mask 14 will be aligned with each of the linear axes for the purpose of calibrating that axis. A similar but circular calibration mask, not shown, can be used for each of the revolute joints.

FIG. 4 shows a manipulator controlled by a robot controller 16 unit 10 having three mutually perpendicular X, Y, and Z arm segments 72, 74, and 76 for providing X, Y, and Z directions of motion of gripper fingers 78. The arm segments 72, 74, and 76 are slidably connected together by holders or joints 80, 82, and 84 to provide an orthogonal manipulator arm similar to that shown in U.S. Pat. No. 4,001,556 to Folchi et al referred to above.

The positioning mechanism for the manipulator hand and fingers also includes a Y-axis motor drive 81 on joint 82 which operatively drives the arm 74 by means of a Y-axis drive cam 86, an X-axis motor drive 79 on joint 80 which operatively drives an X-axis arm 72 by means of a drive cam 88, and a Z-axis motor drive 83 on joint 84 which drives such joint 84 along the Z-axis arm 76 by means of drive cam 90. The Z-axis cam 90 is mounted on upright arm 76 which is mounted at its lower end in a base 92. Positional signals indicative of the displacements of the X, Y arms and Z joint by their respective drive motors 79, 81, and 83 are provided by potentiometer gear racks 94, 96, and 98 extending along respective manipulator arms. Potentiometers 100, 102, and 104 are operatively mounted so that their shaft gears engage with respective potentiometer gear racks. In operation, the longitudinal movements of the manipulator arms and joints and their potentiometer gear racks change the angular position of the respective potentiometer shafts, thereby directly changing its electrical output included in the sensor output block 106 shown in FIG. 4. Sensor output block 106 also includes the pitch, roll, and yaw sensor outputs for the devices, not shown, located in the robot wrist and hand. The circuit block 108 indicated as a calibration system is the system shown and described in detail with respect to FIGS. 1 and 2.

An X, Y, Z orthogonal manipulator comprising the motor drive and cam system is described in U.S. Pat. No. 3,848,515 to B. G. Gardineer and H. A. Panissidi. In this patent, a linear hydraulic motor includes a cyclical linear parabolic cam drive rack mounted on each manipulator arm for producing linear displacement of the arms as a plurality of motor pistons are actuated against the cam rack.

In order to explain how the set of calibration positions may be chosen, the relationship between the nominal positions, Pnominal and the actual positions Pactual of the end effector should be understood. The discrepancy function dE is defined as $$dE(\text{Pnominal}) = dP$$

where $$dP = \text{Pactual} - \text{Pnominal}$$

It is assumed that the position discrepancy is a slowly varying function of the robot's position. In particular, it is assumed that the range of each joint can be subdivided into a set of intervals within each of which the position discrepancy is constant for all practical purposes. Thus, to calibrate the robot it is sufficient to choose an exhaustive set of positions such that for any possible position there is a point in the set having the same discrepancy.

However, it is not practical to choose such an exhaustive set. For example, if there are 6 joints, each of which has a range broken into 100 intervals, then the number of points in the exhaustive set would be 100 raised to the power 6, i.e., 1,000,000,000,000. This exhaustive set would be impractical both because of the time required to calibrate the points and the storage necessary to record the calibration data.

Instead, a much smaller set is choosen, based on the assumption that the discrepancy function can be approximated by a simpler function, in which the contributions of the different joints are decoupled. Thus, for 6 joints with 100 intervals, the number of points needed would be only 600. While it will be clear that many intermediates compromises are possible between these two extremes, the decoupling approximation implementation is generally preferred.

The overall error dE is due to the combination of a set of p specific defects, such as a slightly tilted axis of rotation or an irregular linear beam. Since dE is assumed small, it can be replaced by the differential sum $$dE = A1\,dE1 + A2\,dE2 + \ldots + Ap\,dEp$$

The differential errors dEi are experimentally determined functions of the joint positions. For a slightly tilted axis, for example, the differential error would be the constant angle of tilt, which would have to be determined by experiment. For a linear motor moving along an irregular linear beam, the differential angular error would be a function of the position of that motor, and this function would have to be determined by experiment.

An assumption is made that no differential error is a function of more than one joint position. Thus it is assumed that the contributions of the different joints are decoupled. This assumption is reasonable for all robots with a sequence of joints.

The Ai functions are the partial derivatives $$Ai = fE/fEi \quad (i = 1, \ldots, p)$$

Given any robot and any hypothetical set of specific defects, it is possible in principle to compute all the Ai for that ideal geometry. Thus, the Ai functions do not depend on any experiment. In principle, they are known functions of Pnominal.

These equations may be applied to choose the set of calibration positions. For ease of explanation, assume that the robot has only two joints, termed X and Y. Then $$X\text{actual} = X\text{nominal} + F(X\text{nominal}, Y\text{nominal})$$

$$Y\text{actual} = Y\text{nominal} + G(X\text{nominal}, Y\text{nominal})$$

where F and G describe the discrepancy function.

In the preferred embodiment, the contributions of the different joints are assumed to be decoupled. Thus, the above equations are replaced by $$X\text{actual} = X\text{nominal} + Axx\,Fx(X\text{nominal}) + Axy\,Fy(Y\text{nominal})$$

$$Y\text{actual} = Y\text{nominal} + Ayx\,Gx(X\text{nominal}) + Ayy\,Gy(Y\text{nominal})$$

Here all four of the functions Fx, Fy, Gx, and Gy are functions of a single joint position, and each of these functions needs to be experimentally determined. The four functions Axx, Axy, Ayx, and Ayy in principle may all be computed from the ideal geometry. For ease of explanation, the following discussion assumes that Axx, Axy, Ayx, and Ayy are all equal to the constant 1. However, it will be evident to anyone skilled in the art that this assumption is not an essential limitation of the invention.

Thus $$X\text{actual} = X\text{nominal} + Fx(X\text{nominal}) + Fy(Y\text{nominal})$$

$$Y\text{actual} = Y\text{nominal} + Gx(X\text{nominal}) + Gy(Y\text{nominal})$$

The X joint nominal position is defined to range from Xmin to Xmax with a midpoint of Xo. It is assumed that the range of X can be subdivided into a set of m equal intervals of length Dx within each of which the position discrepancy is constant for all practical purposes. Similarly, the Y joint nominal position is defined to range from Ymin to Ymax with a midpoint of Yo, and the range of Y is subdivided into n intervals of length Dy.

There is no loss of generality in assuming that $$Fx(Xo) = Fy(Yo) = Gx(Xo) = Gy(Yo) = 0$$

The set of nominal calibration points consists of two subsets. The first subset has m+1 points with constant Ynominal = Yo.

(Xmin, Yo), (Xmin+Dx, Yo), (Xmin+2Dx, Yo), ..., (Xmax, Yo) The second subset has n+1 points with constant Xnominal = Xo.

(Xo, Ymin), (Xo, Ymin+Dy), (Xo, Ymin+2Dy), ..., (Xo, Ymax)

These two subsets of nominal positions correspond to the actual positions (X1', Y1'), (X2', Y2'), (X3', Y3'), ..., (Xm', Ym')
(X1'', Y1''), (X2'', Y2''), (X3'', Y3''), ..., (Xn'', Yn'')

Then, Fx(X) is given by $$Fx(X\text{min}) = X1'' - X\text{min}$$

$$Fx(X\text{min} + Dx) = X2' - (X\text{min} + Dx)$$

$$Fx(X\text{max}) = Xm' - X\text{max}$$

and Fy(Y) is given by $$Fy(Y\text{min}) = X1'' - Xo$$

$$Fy(Y\text{min} + Dy) = X2'' - Xo$$

$$Fy(Y\text{max}) = Xn'' - Xo$$

Similarly, Gx(X) is given by $$Gx(X\text{min}) = Y1' - Yo$$

$$Gx(X\text{min} + Dx) = Y2' - Yo$$

$$Gx(X\text{max}) = Ym' - Yo$$

and Gy(Y) is given by $$Gy(Y\text{min}) = Y1'' - Y\text{min}$$

$$Gy(Y\text{min} + Dy) = Y2'' - (Y\text{min} + Dy)$$

$$Gy(Y\text{max}) = Yn'' - Y\text{max}$$

The four displacement functions may be summarized as shown below:

| | |
|---|---|
| Fx(Xmin + jDx) = Xj' − (Xmin + jDx) | (j = 1, ...,m) |
| Fy(Ymin + kDy) = Xk'' − Xo | (k = 1, ... n) |
| Gx(Xmin + jDx) = Yj' − Yo | (j = 1, ... m) |
| Gy(Ymin + kDy) = Yk'' − (Ymin + kDy) | (k = 1, ... ,n) |

It should be clear that although each of these functions has been defined on a discrete domain, interpolation or other curve fitting could be used to obtain calibration data over the intermediate continuous domain.

Figure 5:
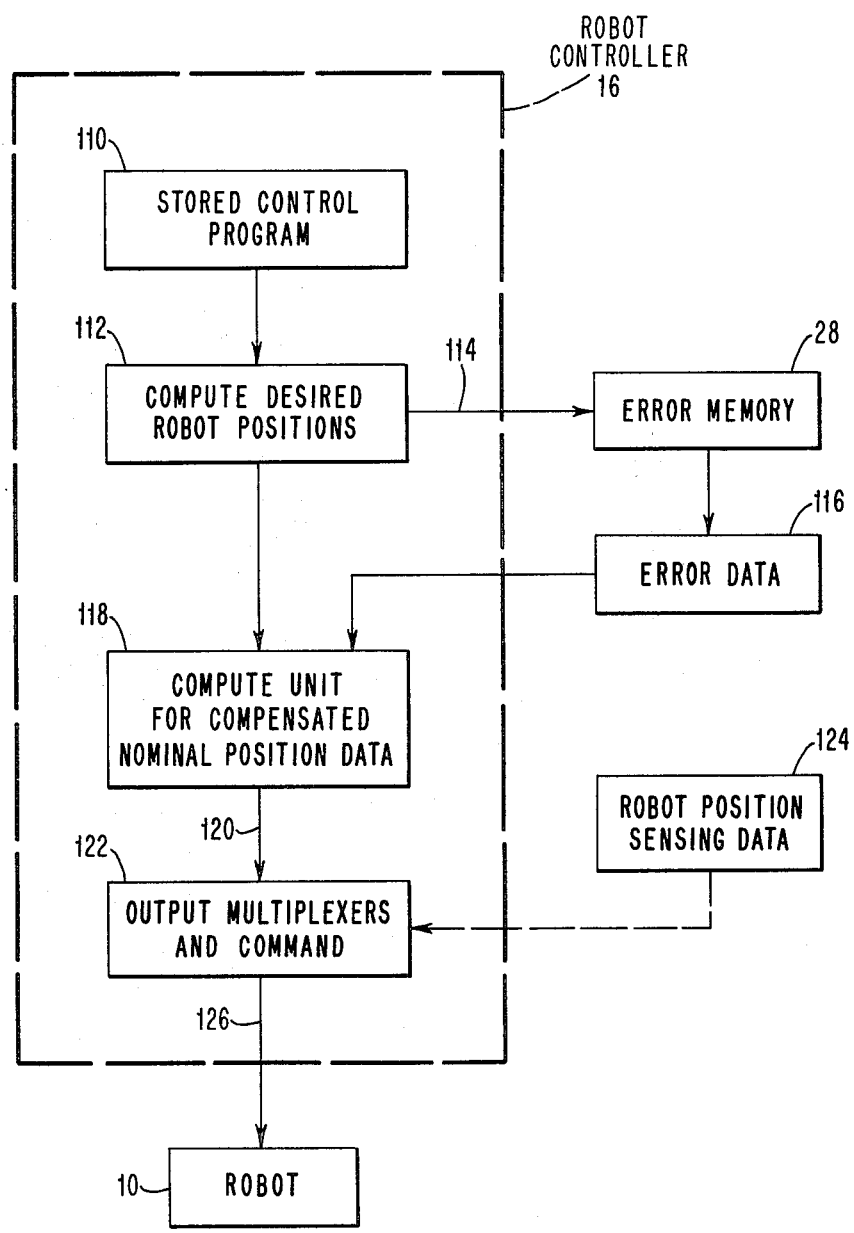
FIG. 5 is a system block diagram of the error compensation portion of the robot controller.

Referring to FIG. 5, there is shown a system block diagram of the error compensation portion of the robot controller 16. During the compensation phase, the robot controller 16 executes a stored control program 110 that sequentially computes desired positions 112 for the robot. For each such desired position, the controller 16 communicates via line 114 with the error memory 28 which recalls error data 116 relevant to this desired position. This error data is transmitted to a compute unit 118 which is under control of the stored control program 110 to combine the error data 116 with the desired position 112 to obtain a nominal position on line 120 that has been compensated for the error. The compute unit 118 and the error memory 28 can comprise a look up table, such as a read-only memory, wherein nominal position data is stored which includes the calibrated error 116 for each desired robot position which is input on line 114.

Output multiplexer and control 122 receives on line 120 the compensated nominal position data 118 and, optionally, the sensed robot position data 124, and then causes control signals to be sent on line 126 to the robot 10 to move the robot to this nominal position. In response, the robot moves not to the specified nominal position but rather to an actual position which differs from the nominal position by the anticipated error, and which actual position is the same as the desired position to high accuracy.

The combination of the error data 116 with the desired position data 112 can be performed in the robot control program in the robot controller as described above, or it can be performed as an algorithm in an auxiliary processor attached to the robot controller. This algorithm could be implemented as electronic hardware or as a stored program in the auxiliary processor.

The computation performed is based on the assumed form of the function that gives the end effector discrepancy as a function of the joint positions and the link geometry. The decoupling approximation discussed above as a means of minimizing the set of calibration points also reduces the complexity of the computation sufficiently that it becomes practical. In spite of the use of approximations, the method provides sufficient accuracy for a large subset of all robots. In particular, the method is especially effective for robots having linear joints.

In order to illustrate the error compensation method, it is assumed that the robot has only two joints, termed X and Y. Suppose that it is desired to move the robot to the actual position (Xactual, Yactual). As described above, the equations relating the actual and nominal positions are assumed to be $$X\text{actual} = X\text{nominal} + Fx(X\text{nominal}) + Fy(Y\text{nominal})$$

$$Y\text{actual} = Y\text{nominal} + Gx(X\text{nominal}) + Gy(Y\text{nominal})$$

These equations may be inverted to give $$X\text{nominal} = X\text{actual} - Fx(X\text{nominal}) - Fy(Y\text{nominal})$$

$$Y\text{nominal} = Y\text{actual} - Gx(X\text{nominal}) - Gy(Y\text{nominal})$$

Since Fx, Fy, Gx, and Gy are all small corrections and since the nominal and actual positions are nearly the same, these equations may be approximated by $$X\text{nominal} = X\text{actual} - Fx(X\text{actual}) - Fy(Y\text{actual})$$

$$Y\text{nominal} = Y\text{actual} - Gx(X\text{actual}) - Gy(Y\text{actual})$$

Therefore, the desired values of Xactual and Yactual would be substituted into these equations to determine the values for Xnominal and Ynominal. The robot would then be commanded to move to the position (Xnominal,Ynominal). In response, the robot would actually move to a position approximating the desired (Xactual,Yactual).

It is to be understood that although each of these functions is defined to be piecewise constant, interpolation or other curve fitting could be used to infer continuous calibration data over the intermediate continuous domain.

During the optional diagnosis phase, the method is the same as during the calibration phase except that the results of the data reduction 52 are not sent to the error memory 28. Instead, the results of the data reduction 52 are sent to the robot controller 16 together with the contents of the error memory 28. A stored program in the robot controller 16 then compares the new calibration data as represented by the results of the current data reduction 52 with the old calibration data as represented by the contents of the error memory 28. If the old and new calibration data are in reasonable agreement, then the robot repeatability has not deteriorated during the time interval between these two calibrations. If, however, the old and new calibration data are not in reasonable agreement, then this method has diagnosed that the robot repeatability has deteriorated, and appropriate corrective measures are taken.

The comparison of the old and new calibration results can be performed in the robot control program in the robot controller 16 as described above, or it can be performed as an algorithm in an auxiliary processor attached to the robot controller 16. This algorithm can be implemented as electronic hardware or as a stored program in the auxiliary processor.

As described above, the set of nominal positions used during calibration consists of subsets. In each subset, only a single joint position varies, while all other joints remain at the midpoints of their ranges. Depending on whether the varying joint is linear or revolute, the corresponding subset of calibration positions describes either a straight line or a segmented circle. Therefore, the complete calibration may be performed by using a set of calibration masks, each of which is either linear or circular.

While the invention has been described in its preferred embodiments, it should be understood that other forms and embodiments may be made without departing from the true scope of the invention.

Having thus described our invention, what we claim as new, and desire to secure by Letters Patent is:

1. A method for calibrating a robot, comprising;

moving the end effectors of a robot in response to commands representative of a set of previously determined nominal positions known to the robot controller;

determining, by actual measurement, the associated actual positions reached by said robot end effector;

comparing said set of nominal positions with said associated actual positions to determine the robot position errors associated with each of said nominal positions by said robot end effector being in physical contact with a stationary calibration mask having a plurality of datum points, edges and surfaces, and storing calibration data representing said robot position errors in an error memory for subsequent use by said robot controller in compensating for inaccuracy of said robot so it moves to the actual desired positions.

* * * * *

UNITED STATES PATENT AND TRADEMARK OFFICE
CERTIFICATE OF CORRECTION

PATENT NO. : 4,362,977
DATED : Dec. 7, 1982
INVENTOR(S) : Roger C. Evans et al.

It is certified that error appears in the above-identified patent and that said Letters Patent are hereby corrected as shown below:

Column 5, line 60, "Ai=∫E/∫Ei  (i=1,...,p)" should read
-- Ai = ∂E/∂Ei   (i = 1,...,p) --

Column 6, line 62, "Fx(Xmin)=X1"-Xmin" should read
-- Fx(Xmin) = X1' - Xmin --

*Signed and Sealed this*

*Fourteenth* Day of *August 1984*

[SEAL]

Attest:

GERALD J. MOSSINGHOFF

*Attesting Officer*     *Commissioner of Patents and Trademarks*